Dec. 26, 1967  M. B. STONEBURNER  3,359,574
FIBERGLASS BATHTUB, ENCLOSURE AND
OTHER HOUSEHOLD UTILITIES

Filed Dec. 31, 1964

Madison B. Stoneburner
INVENTOR.

BY Clarence A. O'Brien
and Harvey B. Jackson
Attorneys

Dec. 26, 1967  M. B. STONEBURNER  3,359,574
FIBERGLASS BATHTUB, ENCLOSURE AND
OTHER HOUSEHOLD UTILITIES
Filed Dec. 31, 1964  2 Sheets-Sheet 2
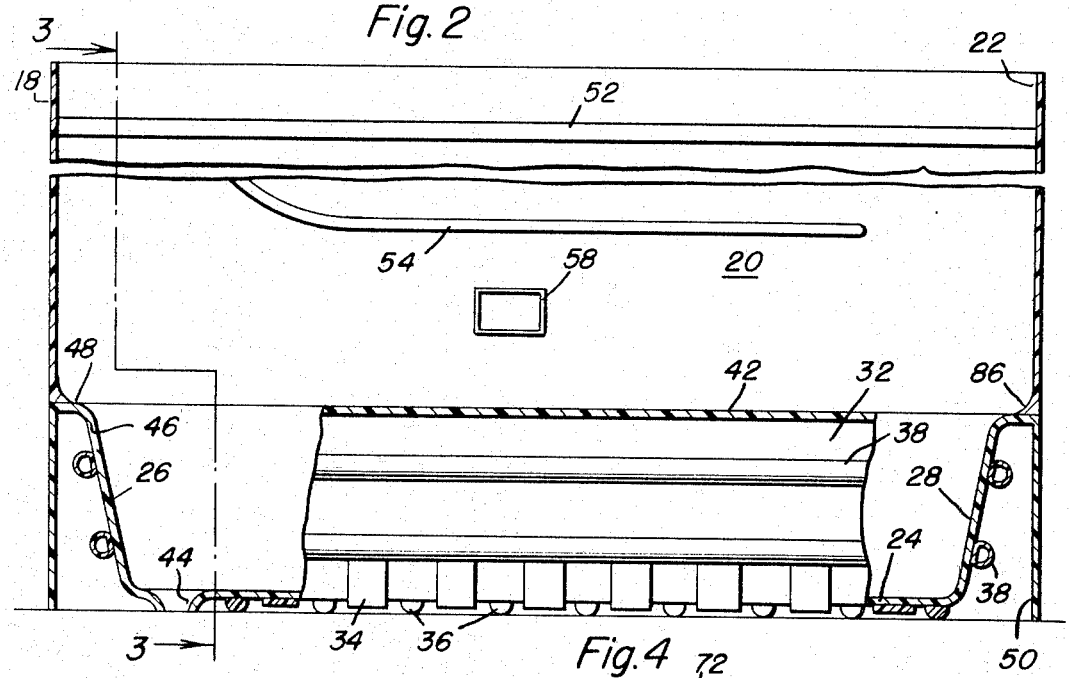
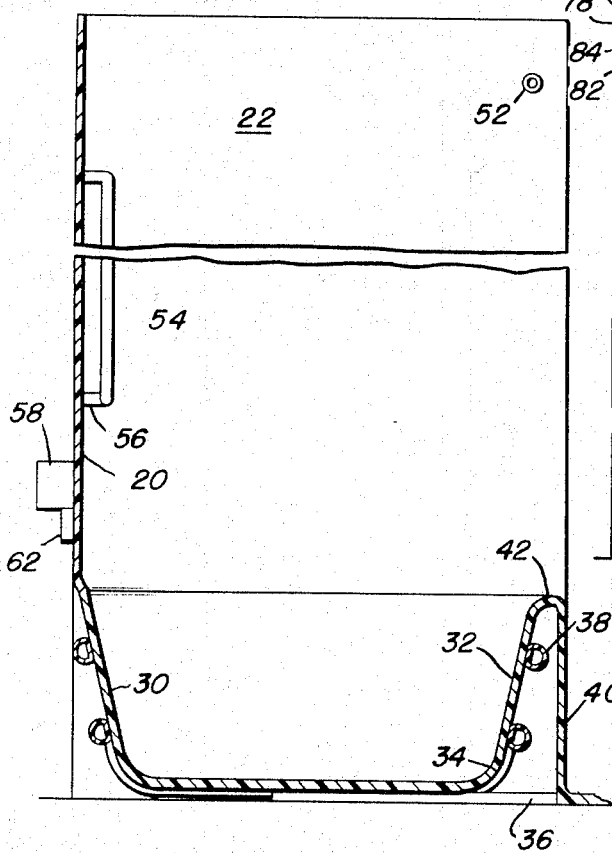
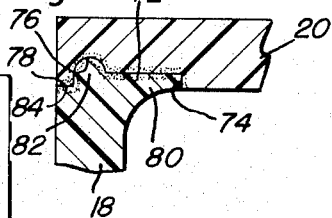
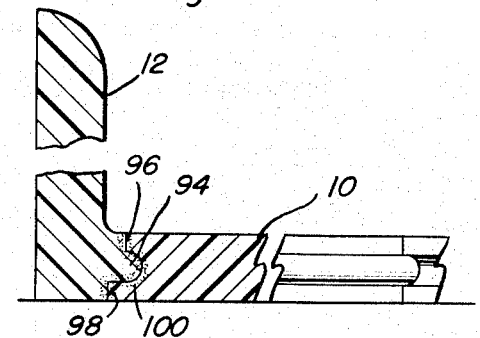
Madison B. Stoneburner
INVENTOR.
BY Clarence A. O'Brien
and Harvey B. Jacobson
Attorneys

United States Patent Office 3,359,574
Patented Dec. 26, 1967

3,359,574
FIBERGLASS BATHTUB, ENCLOSURE AND OTHER HOUSEHOLD UTILITIES
Madison B. Stoneburner, 800 N. Garfield St., Arlington, Va. 22201
Filed Dec. 31, 1964, Ser. No. 422,720
3 Claims. (Cl. 4—173)

ABSTRACT OF THE DISCLOSURE

A bathroom or other household assembly constructed of fiberglass material in which the separate components are interconnected in a manner which produces a completely water-tight joint and a connection which, in effect, produces a unitary monolithic structure. In the bathroom construction, the bathtub is constructed of lightweight fiberglass material having reinforcements provided for strength and rigidity with a joint structure provided between the bathtub and wall panels which also are constructed of fiberglass plastic to provide a rigid and strong joint which is water-tight and, in effect, provides a monolithic construction.

---

The present invention generally relates to various household utilities, those especially useful in the bathroom, constructed of fiberglass material having a special locking joint incorporated therein which is sealed with a bonding material which becomes water-tight and, in effect, unitary in construction.

One of the problems which has been inherent in bathtubs, lavatories, closets, urinals, shower stalls and the like in the bathroom and kitchen sink tops and other utilities therein is the leakage problem. Other problems reside in breakage, chipping, heavyweight, high cost and extensive repair and maintenance. Accordingly, it is the primary object of the present invention to provide a bathtub and enclosure construction which includes components constructed of fiberglass material and secured together by a special locking joint and a liquid fiberglass bonding material which will effectively join the components so that such components, in effect, become of unitary one-piece construction when they have been installed thereby completely eliminating any possibility of leaks and at the same time providing an assembly which is relatively lightweight, inexpensive in initial cost and installation, maintenance free, colorfast and relatively inexpensive to miantain.

Another object of the present invention is to provide a fiberglass bathtub and enclosure together with other household utilities or facilities constructed of fiber reinforced plastic such as fiberglass which is light in weight but has the strength of a cast iron tub but yet weigh approximately one-tenth of the cast iron tub. The fiberglass construction can be made in a wide variety of transparencies and combinations of solid colors thus enabling traditional or modern decorative schemes to be carried out and also enabling custom pieces to be rendered available. Thus, the present invention will render the bathroom more beautiful, healthful and easier to clean in both residential and commercial properties.

Basically, the bathtub is a solid rectangular shaped basin molded into one-piece of glass fiber reinforced plastic having reinforcing provided at critical points to provide rigidity and strength. The bathtub will be non-corrosive and stain-proof and yet chip proof and non-breakable. The enclosure walls may extend partially to the ceiling or completely to the ceiling as desired and additional wall panels matching the tub may be provided and flooring panels of the same material can also be provided thereby enabling the complete bathroom assembly to be of unitary one-piece construction after installation due to the liquid fiberglass bonding material used to join the separate components thus preventing any possibility of leakage into underlying supporting structural components of the building.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an elevational view of the bathroom with a major portion of the bathtub shown in section and other components shown in section for illustrating the structural details thereof;

FIGURE 3 is a vertical sectional view taken substantially upon a plane passing along section line 3—3 of FIGURE 2 illustrating further structural details of the invention;

FIGURE 4 is a detailed sectional view taken substantially upon a plane passing along section line 4—4 of FIGURE 1 illustrating, on an enlarged scale, the details of construction of the locking joint at the corner of the wall enclosure between the back wall and one of the end walls;

FIGURE 5 is a detailed sectional view taken substantially upon a plane passing along section line 5—5 of FIGURE 1 illustrating, on an enlarged scale, the locking joint between a wall panel and floor panels;

Figure 1:
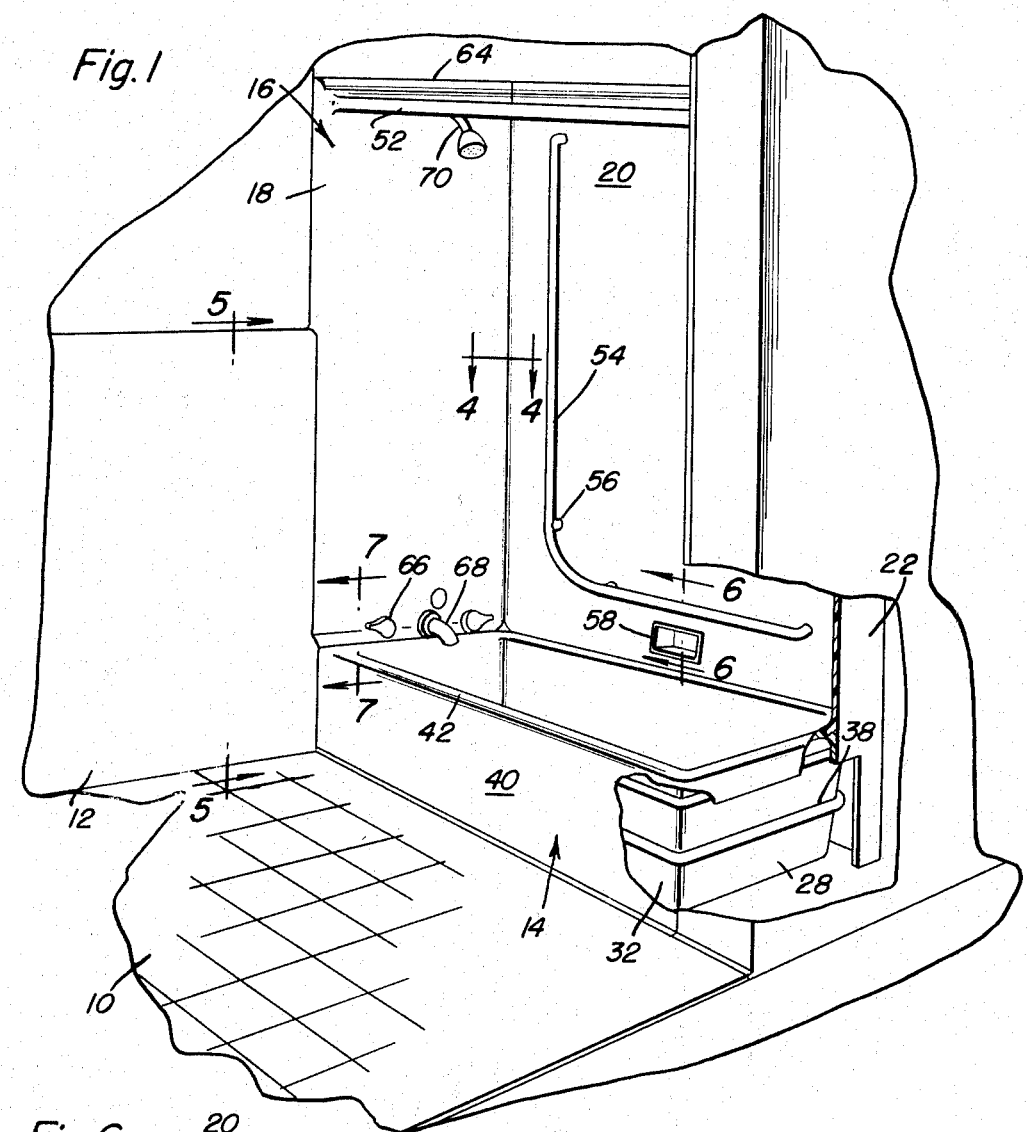
FIGURE 1 is a fragmentary perspective view of a portion of a bathroom illustrating the bathtub and enclosure of the present invention incorporated therein and illustrating wall panels and floor panels associated therewith.
Figure 6:
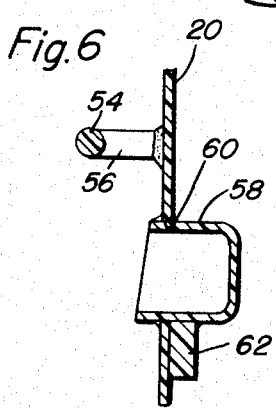
Figure 7:
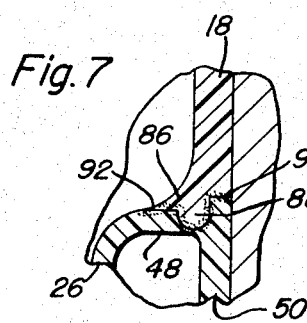

FIGURE 6 is a detailed sectional view taken substantially upon a plane passing along section line 6—6 of FIGURE 1 illustrating, on an enlarged scale, the construction of the hand rail and soap dish; and FIGURE 7 is a detailed sectional view taken substantially upon a plane passing along section line 7—7 of FIGURE 1 illustrating, on an enlarged scale, the locking joint between the bathtub and wall enclosure.

Before describing the specific embodiment of the invention illustrated in the drawings, it is pointed out that the present invention contemplates the construction of various household facilities in addition to the bathtub and enclosure therefor illustrated in the drawings together with the wall panels and floor panels. For example, the present invention contemplates the construction of lavatory bowls and partitions, shower stalls, wall and floors, bathtubs and shower unit combinations, lavatories, urinals, bidets, water closets, commodes and various accessories such as towel racks, soap dishes, and the like. Also, kitchen facilities such as kitchen sink tops and the like may also be constructed employing the principles of the present invention therein.

Referring now specifically to the drawings, FIGURE 1 illustrates a portion of a bathroom including a portion of a floor 10, a wall surface 12, a bathtub 14 and an enclosure 16 for the bathtub 14. The enclosure 16 includes a first end panel or wall 18, a back wall or panel 20 and a second end wall or panel 22 parallel to the first end wall 18 with the end walls 18 and 22 being generally perpendicular to the back wall 20 and forming upward extensions of the back wall and end walls of the bathtub 14 to form a wall enclosure therefor.

The bathtub 14 includes a bottom wall 24, end walls 26 and 28 which are upstanding but slightly outwardly inclined, a rear or inner wall 30 and a front or outer wall 32 all of which are interconnected and provided with smooth transition corners in accordance with conventional bathtub construction concepts. The bathtub 14 is constructed of fiberglass of approximately three-quarter inch thickness and extending transversely under the bottom of the bathtub is a plurality of fiberglass reinforcing bands or straps 34 which are approximately six inches wide and are spaced twelve inches apart. Intermediate the reinforcing straps 34, there is provided a plurality of flat sided tubular or solid rod-like reinforcing supports 36 which are also constructed of the same material.

The end and side walls of the tub are provided with flat sided or half round reinforcing tubes 38 extending peripherally around the walls for reinforcing the walls of the tub. As illustrated in FIGURE 2, the reinforcing bands 34 extend around the corners of the tub and terminate at the bottom reinforcing tube 38 as illustrated in FIGURE 3. Also, as illustrated in FIGURE 3, the half round reinforcing rods 36 extend horizontally forwardly from the front edge of the bottom 24 of the bathtub and engage and reinforce the bottom edge of the vertical skirt 40 forming the front wall 32 at the upper end thereof by a curved ledge 42 of any suitable width and curvature to provide an attractive appearance and also provide a supporting ledge in the nature of a conventional bathtub.

The bathtub is constructed of a suitable conventional size or sizes and is provided with the usual drain opening 44 and overflow opening 46 which are connected with the plumbing facilities in a conventional manner. Also, each of the end walls 26 and 28 is provided with an outwardly curved top ledge 48 which may terminate in a flat edge or be provided with a downwardly extending integral skirt 50 or partial skirt depending upon the installation requirements. For example, if one end of the bathtub is to be exposed, then a complete skirt would be provided therefor. If both ends are to be enclosed as illustrated in FIGURE 1, then the end skirt 50 may be omitted completely or only a partial skirt may be provided for strengthening the end walls 26 and 28 thus providing an extremely strong bathtub but yet one which is light weight in construction. When constructing the bathtub from acrylic fiberglass, color will be incorporated therein as desired and such color will penetrate completely through the material from which the bathtub is made so that there will be no possibility of chipping or changes in color as the bathtub surfaces are cleaned.

The wall enclosure 16 is constructed of the same acrylic fiberglass material as employed in the bathtub and the upper outer corners of the end walls 18 and 22 are interconnected by a fiberglass rail 52 which serves to rigidify the end panels and also forms a support for a shower curtain in a conventional manner. The rail 52 is integrally joined to the end walls 18 and 22. Attached to the back wall 20, there is an elongated L-shaped handrail 54 being supported from the back wall 20 in spaced relation by short supporting rods 56. The handrail 54 and spacing members 56 are of fiberglass material and rigidly joined to the back wall 20. Also incorporated into the back wall 20 is a horizontally opening soap receptacle 58 that is integrally formed in an opening 60 and has a reinforcing supporting member 62 along the bottom thereof. The upper edges of the panels 18, 20 and 22 are rounded as at 64 to provide a smooth transition into the wall surface. In the event the walls are to extend completely to the ceiling, then the rounded upper ends, of course, are not necessary. Also, the end wall 18 is provided with openings receiving the usual control handles 66 for controlling inflow of water through a faucet 68 above the tub or through a shower member 70 adjacent the upper end of the wall enclosure.

A significant feature of this invention resides in the manner of joining the panels of the wall enclosure 16 together as illustrated in FIGURE 4 and the manner of joining the wall enclosure panels to the bathtub as illustrated in FIGURE 7 and also the manner of joining the bathtub or wall panels to the floor panels as illustrated in FIGURE 5. Each of these joints is a joint between acrylic fiberglass material and the joint is formed by using a liquid fiberglass bonding material such as an epoxy or equivalent bonding material which, in effect, causes the joining surfaces to completely intermingle thus forming a continuous one-piece structure when the joint has been formed. When the liquid fiberglass bonding material is set, it becomes homogeneous with the fiberglass of the panels and the fiberglass panels which were joined become, in effect, one-piece so that the strength of the joint is the same as the strength of the panels. This will provide a completely water-tight construction. Also, this will prevent separation of the bathtub from wall panels, floor panels and the like and eliminate any possibility of leakage at the juncture between the bathtub and floor panels which is where leakage usually occurs.

Referring first to FIGURE 4, the back panel 20 is provided with a flat recessed portion 72 terminating at its inner extremity in a shoulder 74 and having a semi-cylindrical groove 76 defining the outer extremity thereof. The groove 76 is provided with a projecting outer edge defining an offset lip 78 which extends beyond the plane of the recess 72. The corresponding abutting edge of the panel 18 is provided with a laterally curved lip 80 and a semi-cylindrical projection 82 and a recessed portion 84 conforming with the surface areas of the recess in the edge of the back panel 20. This joint not only serves to interlock the panels 18 and 20 but due to the location relationship of the surfaces 72 and the projecting lip 78, the juncture line between the panels is offset thus further rigidifying the juncture between the panels 18 and 20. The dotted area of the joint indicates the intermingling of the surfaces when the liquid fiberglass bonding material is used to join the panels so that the panels 18 and 20, in effect, become a single panel. Also, as illustrated, the laterally extending lip 80 on the end panel 18 is curved to provide a smoothly curved corner surface to facilitate cleaning of the enclosure and to prevent accumulation of dirt and the like in the corner joint such as occurs in normally tiled wall enclosures where the joint is coincidental with the corner.

The wall panel may be constructed of lightweight fiberglass plastic of approximately one-quarter inch thickness and the thickness of the projecting lip 80 may be approximately one-sixteenth inch and the lip 78 may project approximately one-sixteenth of an inch beyond the surface 72 and the diameter of the semi-cylindrical groove and corresponding projection may be approximately one-eighth inch. By using the liquid fiberglass bonding material, the panels 18 and 20 are not only interlocked but securely fixed to each other.

FIGURE 7 illustrates the juncture between the end wall 18 and the top ledge 48 of the end wall 26 of the bathtub. This joint is substantially similar to the joint employed in FIGURE 4 in that the bottom edge of the end wall panel 18 is provided with a projecting lip 86 that is provided with a smoothly curved surface merging with the inner surface of the end wall 26 to provide a smooth transition. The lower edge of the end wall panel 18 is provided with a semi-cylindrical projection 88 received in a corresponding groove and the edge of the tub is provided with a projecting lip 90 which is above the top edge 92 of the ledge 48. This joint thus is also bonded together by using liquid fiberglass bonding material and the outside lip 90 is spaced above the top edge 92 of ledge 48 to provide not only interlocking between the end and back panel with the bathtub but also provides a juncture which is secure and rigid.

FIGURE 5 illustrates the juncture between the side wall 12 and the floor panels 10 and this juncture is substantially the same as that employed in FIGURES 4 and 7 in that the lower edge of the wall panel 12 is provided with a projecting lip 94 of semi-cylindrical construction and an upper surface 96 and a lower surface 98 which is offset in relation to the surface 96 for receiving a corresponding projecting lip 100 on a floor panel which may be of any suitable size such as 9 inches by 9 inches, 12 inches by 12 inches or the like. This structure also is joined in the same manner by using liquid fiberglass bonding material and provides not only an interlocking joint but a staggered joint line so that the joint will be secure and as strong as the material of the wall and floor panels. In each instance, the projecting lip projects approximately one-sixteenth inch and the diameter of the bead is approximately one-eighth inch with the wall panels being typically one-quarter inch in thickness. The structure illustrated in FIGURE 5 is also illustrated at the bottom edge of the front skirt wall 40 of the bathtub in which a projecting flange or lip is provided at the lower edge of the necessary thickness for joining with the floor panels. Thus, when the wall enclosure panel, wall panels, floor panels and bathtub are all joined, a single monolithic structure is provided which absolutely precludes any leakage.

As indicated previously, the bathtub may be constructed in standard sizes presently employed in the plumbing industry and the height of the wall panels 18, 20 and 22 as the wall panels 12 may be of standard size.

The special locking joints which are sealed with liquid fiberglass bonding material become water-tight and as strong as the panels which are joined. The panels form a one-piece structure covering the walls and floors outside of the tub area as well as the tub and wall enclosure itself thus making the complete bathroom free of leaks. In addition, water closets, lavatories, commodes and other bathroom accessories may be constructed of the same material and color thereby creating a new mode of constructing ultra-modern baths and fixtures at a lower cost with additional savings occurring due to reduction of repair and maintenance due to leaks from water damage. Some of the advantages of the present invention over present structures are the extreme resistance to breaking and chipping, fused and locked joints that prevent cracks and leakage in the walls, negligible repair and maintenance, lightweight but with high strength and sturdiness, independence of building wall construction, flexibility of shapes, sizes and bathroom design, construction of accessories and equipment of the bathroom of similar construction, outstanding interior decorating potential with colors and designs built into the fiberglass material and ease of assembly without special equipment.

A bathtub constructed of acrylic fiberglass plastic has the strength of welded steel sheets and will weigh approximately one-tenth of a cast iron tub. The fiberglass can be made in a wide variety of colors and designs as deemed desirable. If desired, a fiberglass door and bathtub and shower plumbing fixtures can be employed in a contrasting color. The fiberglass tub will be non-corrosive and stain-proof and the wall panels may either match the shower unit and tub or contrast therewith and may cover walls to whatever level desired and the flooring may also be of the same material or a compatible colored material. Various accessories such as the handrail may be provided for safety. For example, curved headrests for reclining may be incorporated into the end wall, book rests or seats may also be employed by molding into the walls of the tub, recesses for receiving a transverse support or the like. Also, the end of the bathtub remote from the faucets may be inclined to a greater degree than illustrated to form an inclined backrest.

The fused joints which are tightly fitting prior to fusion provide crack proof, leakproof corners and joints that assure greater sanitation and cleanliness and the monolithic construction of the bathtub and wall unit does not require support of the building walls and need not be firmly attached to the walls in that the device will stand unimpaired even though the walls of the building may be settled or warped. The bathtub, wall enclosure and wall units as well as the floor may be attached to supporting structures by the liquid fiberglass bonding material which will form a firm and secure bond. Also, the fiberglass material may be impregnated with a suitable germicidal agent such as hexachlorophene that will have a considerable life expectancy in order to kill bacteria thereby maintaining the sanitation properties of the bathroom at a high level.

While other bathroom facilities have not been illustrated specifically in the drawings, it is pointed out that such items may be constructed of the same material thus providing a highly decorative bathroom and one which encompasses the various structural advantages mentioned previously.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bathtub constructed of fiberglass plastic and including a unitary bottom, end walls and a front and rear side wall, a vertically disposed front skirt in spaced relation to the front side wall and having the upper edge thereof unitary with the upper edge of the front side wall, said end walls and side walls being encircled on the exterior surface thereof with vertically spaced reinforcing tubes extending continuously circumferentially therearound, said bottom wall including transversely extending reinforcing bands spaced longitudinally on the external surface thereof, said bands extending partially up along the side walls and joined with the circumferential tube encircling the side and end walls, and a plurality of longitudinally spaced, transversely extending flat sides, rod-like reinforcing supports on the external surface of the bottom wall, said rod-like reinforcing supports being disposed intermediate the straps, one end of each rod-like reinforcing support extending laterally outwardly of the front side wall and joined with the lower edge of the front skirt.

2. A bathtub constructed of fiberglass plastic and including a unitary bottom, end walls and a front and rear side wall, a vertically disposed front skirt in spaced relation to the front side wall and having the upper edge thereof unitary with the upper edge of the front side wall, said end walls and side walls being encircled on the exterior surface thereof with vertically spaced reinforcing tubes extending continuously circumferentially therearound, said bottom wall including transversely extending reinforcing bands spaced longitudinally on the external surface thereof, said bands extending partially up along the side walls and joined with the circumferential tube encircling the side and end walls, and a plurality of longitudinally spaced, transversely extending rod-like reinforcing supports on the external surface of the bottom wall, said rod-like reinforcing supports being disposed intermediate the straps, one end of each rod-like reinforcing support extending laterally outwardly of the front side wall and joined with the lower edge of the front skirt, upstanding end wall panels and an upstanding rear wall panel disposed above the end walls and rear wall of the bathtub, means including an interlocking joint connecting the vertical edges of the rear wall panel to the adjacent edges of the end wall panels, means including an interlocking joint connecting the lower edge of the end wall panels with the end walls of the bathtub and connecting the rear wall panel to the rear side wall of the bathtub, each interlocking joint including a longitudinal rib and groove arrangement and abutting surfaces extending from both sides of the rib and groove arrangement, said abutting surfaces disposed in offset relation to each other, and a bonding material securing the offset abutting surfaces and the rib and groove arrangement in rigid connecting relationship and in a water-tight manner to eliminate leaks and cracks, the panel having the groove thereon having a laterally projecting lip at the inner edge thereof forming a portion of the abutting surface and having a smoothly curved surface remote from the abutting surface merging with the inner surface of the panel thereby forming a rounded corner at the juncture between adjacent panels to enable easier cleaning thereof.

3. The structure as defined in claim 2 together with a floor covering panel, means including an interlocking joint connecting the floor panels to the front skirt of the bathtub, a wall panel extending upwardly from the floor panel in alignment with the end wall panel extending above an end wall of the bathtub, means including an interlocking joint including a rib and groove arrangement, floor panel and interconnecting the wall panel with the end wall panel overlying an end wall of the bathtub, each interlocking joint including a rib and groove arrangement, abutting surfaces extending laterally from both sides of the rib and groove arrangement, said abutting surfaces being disposed in offset relation, and a bonding material interconnecting the rib and groove arrangement and the abutting surfaces to form a unitary connection.

References Cited

UNITED STATES PATENTS

| | | | |
|---|---|---|---|
| 2,087,121 | 7/1937 | Samelow | 4—2 X |
| 2,431,475 | 11/1947 | Gruen | 4—173 |
| 2,820,228 | 1/1958 | Rodman | 4—173 |
| 2,920,682 | 1/1960 | Lindberg | 156—293 X |
| 3,010,116 | 11/1961 | Cowley | 4—175 X |
| 3,088,124 | 5/1963 | Long | 4—173 |
| 3,158,237 | 11/1964 | Schooler | 4—173 X |
| 3,212,106 | 10/1965 | Noel | 4—69 |
| 3,215,576 | 11/1965 | Huff | 156—162 |

HAROLD J. GROSS, *Primary Examiner.*